US012585848B2

(12) United States Patent     (10) Patent No.:   US 12,585,848 B2

Padmanabhan et al.     (45) Date of Patent:    Mar. 24, 2026

(54) MACHINE LEARNING TECHNIQUES FOR CIRCUIT DESIGN VERIFICATION

(71) Applicant: TEXAS INSTRUMENTS INCORPORATED, Dallas, TX (US)

(72) Inventors: Venkateswaran Padmanabhan, Bengaluru (IN); Gopika Kumar, Bengaluru (IN); Guha Lakshmanan, Bengaluru (IN); Kriyangbhai Shah, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 871 days.

(21) Appl. No.: 17/845,784

(22) Filed: Jun. 21, 2022

(65) Prior Publication Data

US 2023/0409789 A1     Dec. 21, 2023

(51) Int. Cl.
*G06F 30/3308*     (2020.01)
*G06N 3/08*     (2023.01)
*G06F 119/12*     (2020.01)

(52) U.S. Cl.
CPC ........... *G06F 30/3308* (2020.01); *G06N 3/08* (2013.01); *G06F 2119/12* (2020.01)

(58) Field of Classification Search
USPC ......................................................... 716/106
See application file for complete search history.

(56) References Cited

U.S. PATENT DOCUMENTS 10,607,039 B1 *   3/2020   Kinderman ............ G05B 17/02

* cited by examiner

*Primary Examiner* — Bryce M Aisaka
(74) *Attorney, Agent, or Firm* — Carl G. Peterson; Frank D. Cimino

(57) ABSTRACT

A method includes obtaining a set of simulated signal values for an integrated circuit, providing the obtained set of simulated signal values to a machine learning model, and obtaining, from the machine learning model, one or more predicted output signal values of the integrated circuit. The method also includes comparing the predicted output signal values to actual output signal values of the integrated circuit to validate the integrated circuit.

20 Claims, 11 Drawing Sheets

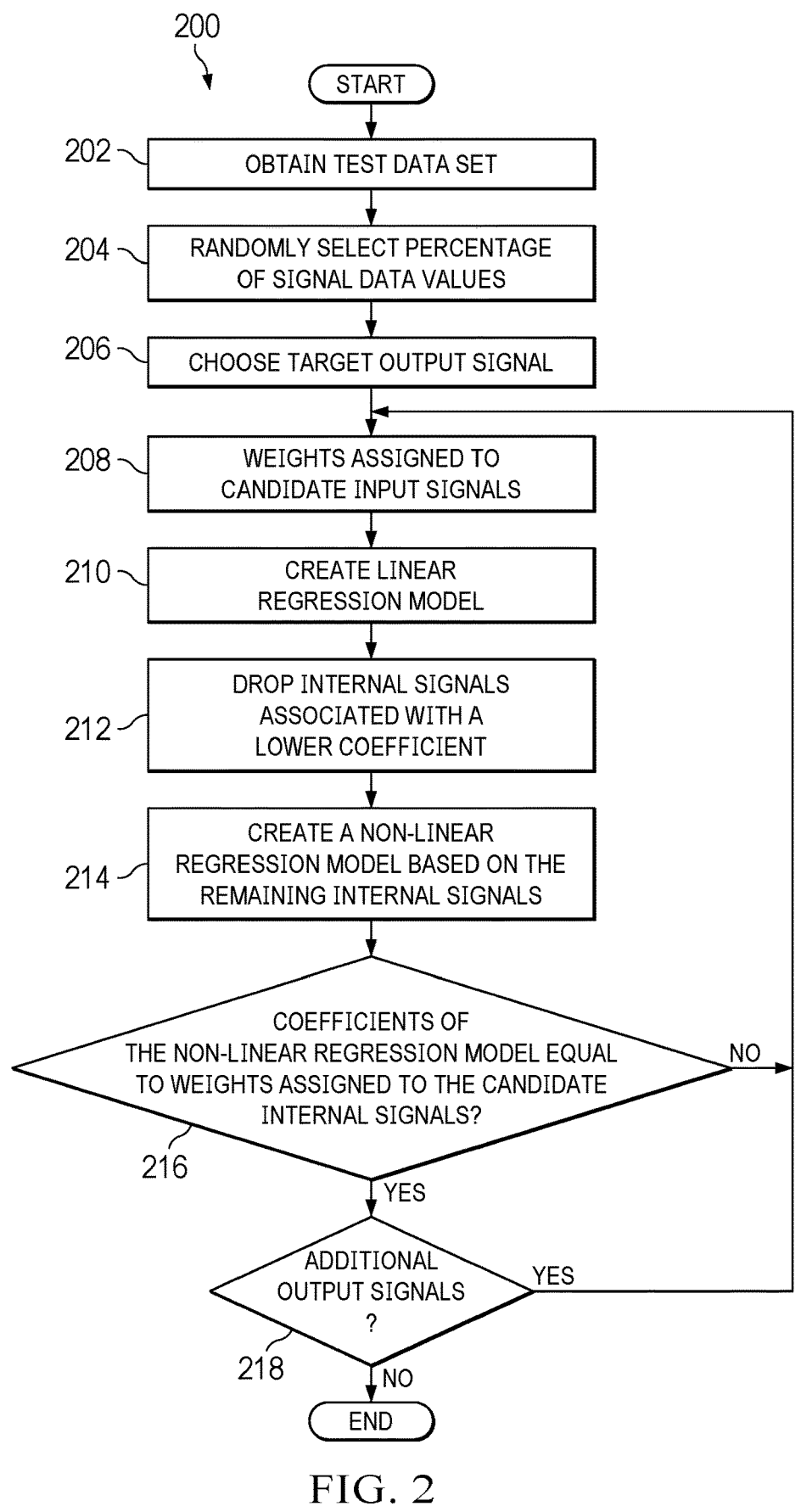

200

START

202 — OBTAIN TEST DATA SET

204 — RANDOMLY SELECT PERCENTAGE OF SIGNAL DATA VALUES

206 — CHOOSE TARGET OUTPUT SIGNAL

208 — WEIGHTS ASSIGNED TO CANDIDATE INPUT SIGNALS

210 — CREATE LINEAR REGRESSION MODEL

212 — DROP INTERNAL SIGNALS ASSOCIATED WITH A LOWER COEFFICIENT

214 — CREATE A NON-LINEAR REGRESSION MODEL BASED ON THE REMAINING INTERNAL SIGNALS

216 — COEFFICIENTS OF THE NON-LINEAR REGRESSION MODEL EQUAL TO WEIGHTS ASSIGNED TO THE CANDIDATE INTERNAL SIGNALS?    NO

YES

218 — ADDITIONAL OUTPUT SIGNALS ?    YES

NO

END

404 — SIGNAL VALUES DATA

402 — ML MODEL 1

PREDICTED FSM STATE ⟋ 406

408 — ML MODEL 2

410 — PREDICTED IC OUTPUT

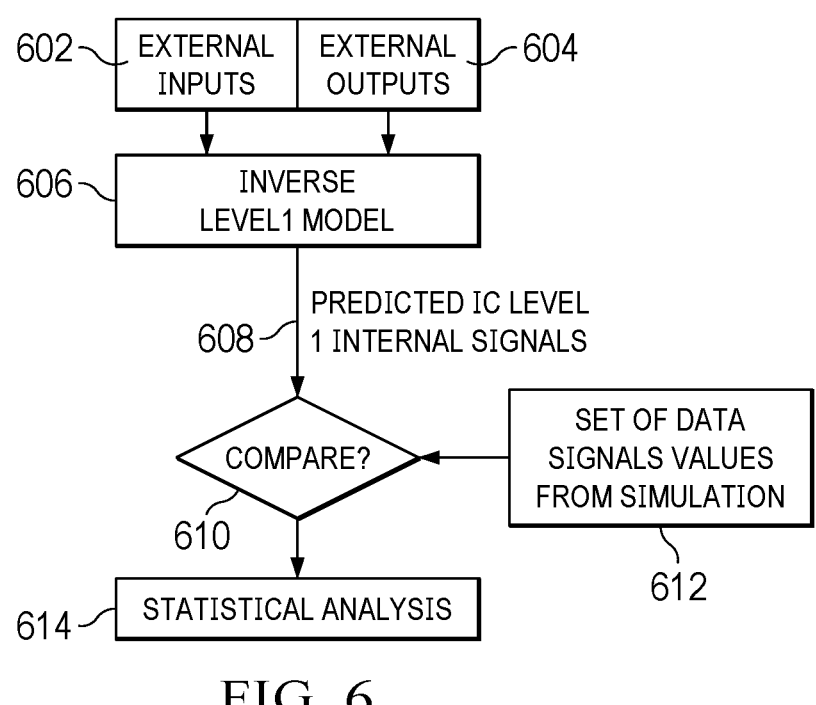
FIG. 6

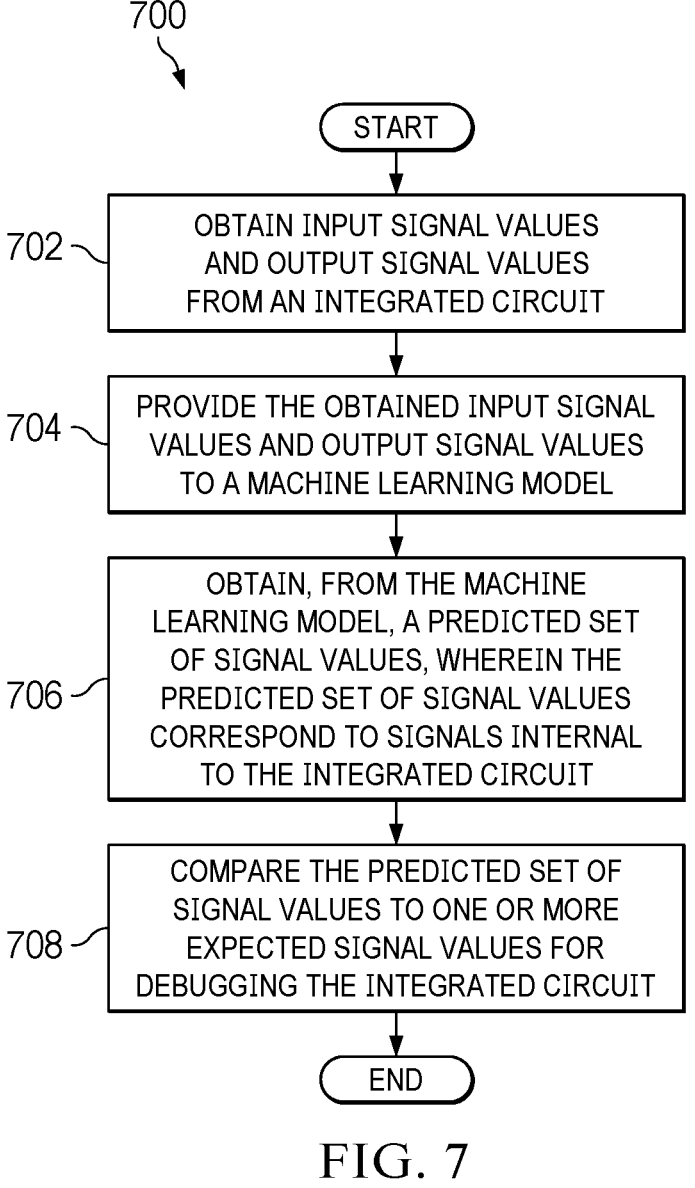

700

START

702 — OBTAIN INPUT SIGNAL VALUES AND OUTPUT SIGNAL VALUES FROM AN INTEGRATED CIRCUIT

704 — PROVIDE THE OBTAINED INPUT SIGNAL VALUES AND OUTPUT SIGNAL VALUES TO A MACHINE LEARNING MODEL

706 — OBTAIN, FROM THE MACHINE LEARNING MODEL, A PREDICTED SET OF SIGNAL VALUES, WHEREIN THE PREDICTED SET OF SIGNAL VALUES CORRESPOND TO SIGNALS INTERNAL TO THE INTEGRATED CIRCUIT

708 — COMPARE THE PREDICTED SET OF SIGNAL VALUES TO ONE OR MORE EXPECTED SIGNAL VALUES FOR DEBUGGING THE INTEGRATED CIRCUIT

END

FIG. 7

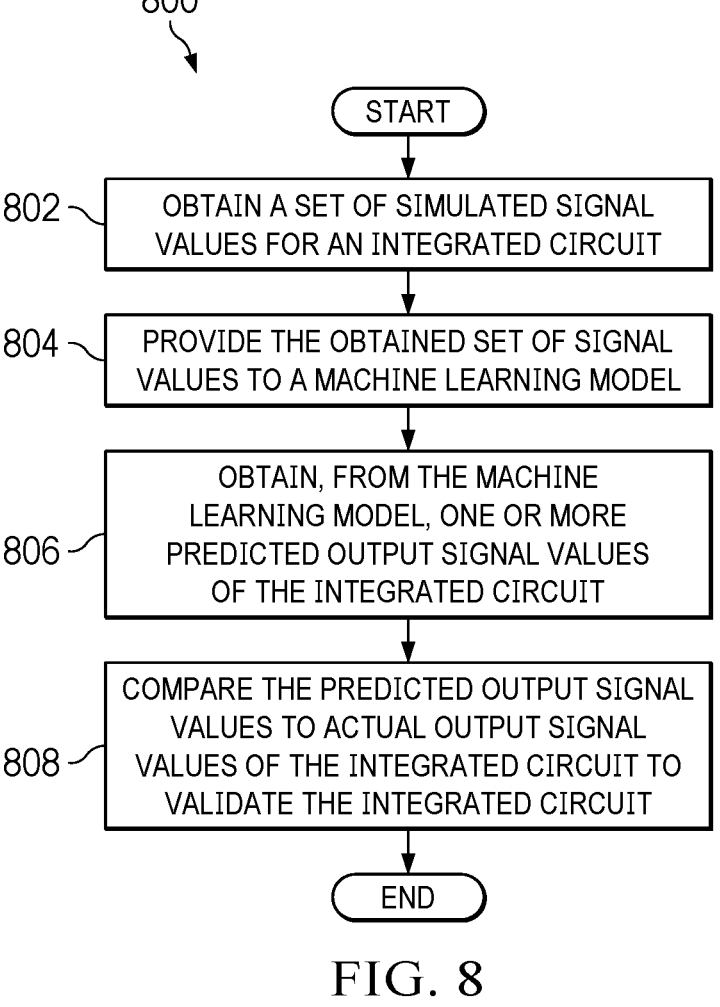

800

START

802 — OBTAIN A SET OF SIMULATED SIGNAL VALUES FOR AN INTEGRATED CIRCUIT

804 — PROVIDE THE OBTAINED SET OF SIGNAL VALUES TO A MACHINE LEARNING MODEL

806 — OBTAIN, FROM THE MACHINE LEARNING MODEL, ONE OR MORE PREDICTED OUTPUT SIGNAL VALUES OF THE INTEGRATED CIRCUIT

808 — COMPARE THE PREDICTED OUTPUT SIGNAL VALUES TO ACTUAL OUTPUT SIGNAL VALUES OF THE INTEGRATED CIRCUIT TO VALIDATE THE INTEGRATED CIRCUIT

END

FIG. 8

MACHINE LEARNING TECHNIQUES FOR CIRCUIT DESIGN VERIFICATION

BACKGROUND

Modern integrated circuits (ICs), both analog and digital, are very complex with anywhere from tens of thousands of components to billions of components on a single IC. Such ICs are often designed through a multi-step design cycle, which can take a substantial amount of time, often years. As a part of this IC design cycle, prototype ICs may be created for testing and characterization against the intended design/specifications.

This testing and characterization often include equivalence checking, which compares the analog waveform produced by an analog or analog/digital hybrid IC under test in response to external stimuli to expected analog waveforms. These expected analog waveforms may be generated, for example, from a simulation. To generate these expected waveforms, the IC under test is modeled in detail for every timescale the IC can receive input at. For example, if the IC can receive input at a steady state as well as at a rate of 100 MHz, the IC may be modeled across a range of frequencies from 1 Hz to 1+ GHz to obtain a sufficient timescale to detect, for example, potentially problematic transient spikes or dips in the analog waveform, as this analog waveform is a continuous signal. Additionally, as analog functionality is typically specified as limits rather than strictly binary values, a number of outputs may be valid for a single input. Further, these models are difficult to accurately synchronize with the IC under test across the timescales or utilize detailed modeling, which is time intensive to generate. A technique to predict an output waveform value for an IC at any timescale may be useful. Moreover, such techniques may be useful for characterization and verification of ICs under test, as well as during design of ICs.

SUMMARY

In one example, a method includes obtaining a set of simulated signal values for an integrated circuit, providing the obtained set of simulated signal values to a machine learning model, and obtaining, from the machine learning model, one or more predicted output signal values of the integrated circuit. The method also includes comparing the predicted output signal values to actual output signal values of the integrated circuit to validate the integrated circuit.

In another example, a non-transitory program storage device includes instructions stored thereon to cause one or more processors to: obtain a set of simulated signal values for an integrated circuit, provide the obtained set of simulated signal values to a machine learning model, obtain, from the machine learning model, one or more predicted output signal values of the integrated circuit, and compare the predicted output signal values to actual output signal values of the integrated circuit to validate the integrated circuit.

In yet another example, a system for debugging an integrated circuit includes a memory and one or more processors operatively coupled to the memory. The processors are configured to execute instructions causing the one or more processors to: obtain a set of simulated signal values for an integrated circuit, provide the obtained set of simulated signal values to a machine learning model, obtain, from the machine learning model, one or more predicted output signal values of the integrated circuit, and compare the predicted output signal values to actual output signal values of the integrated circuit to validate the integrated circuit.

BRIEF DESCRIPTION OF THE DRAWINGS

For a detailed description of various examples, reference will now be made to the accompanying drawings in which:

FIG. 2 is a flow diagram illustrating a technique for selecting signal values data and weights, in accordance with aspects of the present disclosure.

FIG. 6 is a block diagram illustrating use of an inverse model of an IC for debugging, in accordance with aspects of the present disclosure.

FIG. 7 is a flow diagram illustrating a technique for debugging an integrated circuit, in accordance with aspects of the present disclosure.

FIG. 8 is a flow diagram illustrating a technique for validating an IC, in accordance with aspects of the present disclosure.

The same reference numbers or other reference designators are used in the drawings to designate the same or similar (either by function and/or structure) features.

DETAILED DESCRIPTION

Generally, designing an analog circuit begins with a set of specification and/or features that the circuit is supposed to support. From these specifications and/or features, a design of the circuit may be created describing the physical parameters of electrical components of the circuit. Based on this design, one or more models for the circuit, and/or sub-parts of the circuit, may be created. For example, the circuit may be modeled, for example, in a hardware description language (HDL), and the circuit may be simulated on circuit simulation software, such as a simulation program with integrated circuit emphasis (SPICE) modeling software, and modeled against the IC specifications. These simulations may generate detailed logs and other information.

Figure 1A:
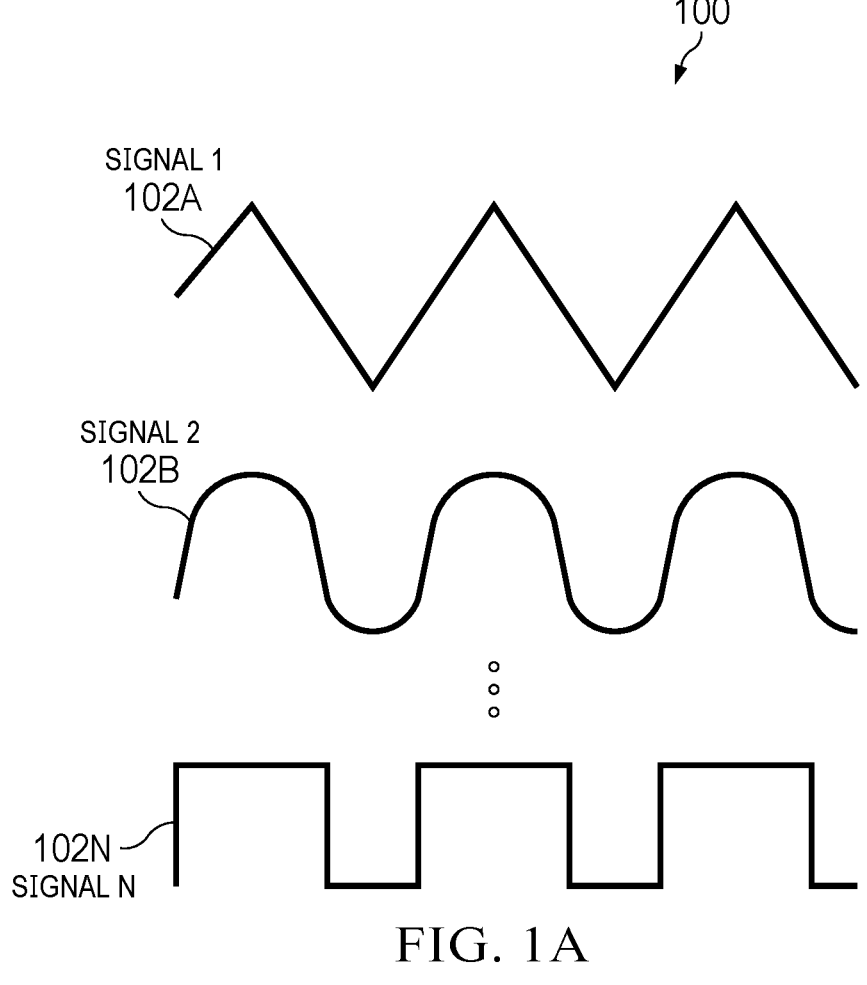
FIG. 1A is a signal diagram illustrating an example visualization of the output of a circuit simulation model, in accordance with aspects of the present disclosure.

FIG. 1A is a signal diagram 100 illustrating an example visualization of the output of a circuit simulation model, in accordance with aspects of the present disclosure. In the example shown in signal diagram 100, a circuit may have an N number of input and output signals 102A . . . 102N. These signals can include the input signals to the circuit and output signals from the circuit, as well as signals internal to the circuit. Each signal has a continuous value, which can vary.

For example, an output signal value from the circuit may change as one or more input signal values are changed. These signal values and corresponding changes are modeled by the circuit simulation software to generate logs of corresponding expected signal values. These signal values are shown graphically in signal diagram 100.

Figure 1B:
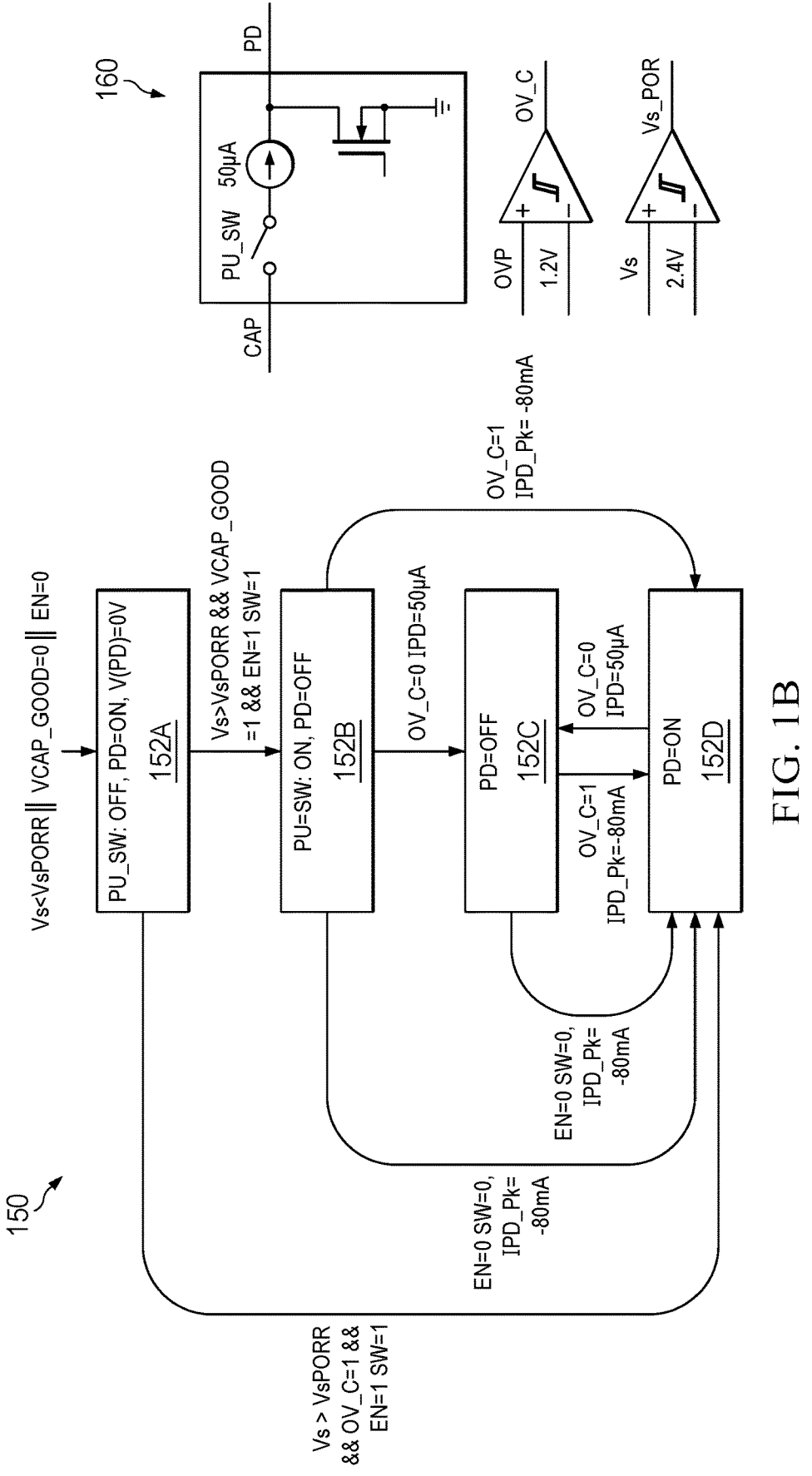
FIG. 1B illustrates an example FSM model and corresponding circuit, in accordance with aspects of the present disclosure.

Additionally, a finite state machine (FSM) model may be developed for the circuit. As an example, a Verilog FSM model may be created based on the logic governing the circuit. The FSM model describes the states that the circuit may be in and the logic governing the transitions between the states. FIG. 1B illustrates an example FSM model 150 and corresponding circuit 160, in accordance with aspects of the present disclosure. In this example, the FSM model 150 includes four states 152A, 152B, 152C, and 152D, along with conditions that may cause a transition between the states. It may be understood that while the FSM model 150 is a graphical representation of the FSM, the FSM model 150 may also be encoded as a set of values, such as by using a binary, gray, one hot, one cold, etc. encoding scheme.

During IC design, various combinations of input/output signals may be simulated on the circuit simulation model, for example, to verify that the design of the IC corresponds to the specifications and/or features. These various combinations may be defined based on a set of test cases that are used to verify the design. As a part of testing an IC design, a coverage tool of the circuit simulator may be used to determine how thoroughly the test cases exercise the IC design. The coverage tool can return an indication of how well the test cases cover the IC design and/or the FSM state transitions. Additionally, the code coverage tool can be configured to generate a list of the test cases ranked by how well each test case covered the IC design and/or the FSM state transitions.

This per test case coverage metric may be used to identify higher priority test cases from which expected signal values may be extracted. For example, the coverage tool may be able to determine an optimized set of test cases to cover the IC design and/or the FSM state transitions. A number of test cases may be selected in a variety of ways, for example, based on the optimized set of test cases identified by the coverage tool, a coverage threshold target, a set number of test cases, or a target amount of test data generated from the test cases, some combination thereof, etc. The expected signal values data from the simulation of the test cases may be stored and used to train a machine learning (ML) model of the IC.

The expected signal values data from the simulation of a subset of test cases may be used to train the ML model of the IC rather than all of the test cases because the set of expected signal values generated from simulations can be very extensive as the simulation can be run at nearly any time step. Multiple time steps may also be used for the simulation as an analog IC is continuous in nature, rather than discrete, such as for a digital signal and multiple time steps allow for a balance between accuracy of the simulation and speed of the simulation. Executing all of the test cases across multiple time steps can generate an extensive amount of data for the expected signal values, and this data may be too extensive for use as training data for a machine learning (ML) model of the IC. Additionally, the full set of test cases may be a relatively unbalanced data set as the full test suite may include, for example, error cases, boot self-tests, reset operations, regression test cases, etc., which may not be useful for training an ML model. Selecting fewer test cases also helps reduce the amount of data generated to a more manageable level. Selecting test cases based on how well the test cases cover the IC design/FSM states helps maximize the coverage of IC design while limiting a number of test cases and redundancy while helping to maintain a balanced data set.

In some cases, the expected signal values data for training the ML model of the IC may be selected based on an output signal of the IC. FIG. 2 is a flow diagram 200 illustrating a technique for selecting signal values data and weights, in accordance with aspects of the present disclosure. As indicated above, a full set of test cases may be simulated on the IC being developed to generate a test data set 202 of expected signal values. This test data set includes expected top-level signal values (e.g., signals that are input to/output from the IC), as well as internal signal values (e.g., signal values of circuits internal to the IC). At block 204, a percentage of the signal values data from the expected signal values are chosen randomly. For example, from all the expected signal values, both top-level signals and internal signals, forty percent of the signal values data from the expected signal values are randomly selected. By randomly selecting a subset of the signal values data, the set of all data values for all the signals is dramatically reduced, while still retaining a relatively representative set of data values.

At block 206, a target output signal for modeling is chosen. For example, a particular output signal of interest from the IC is chosen as an initial output signal. At block 208, candidate internal signals are weighted based on importance. Candidate internal signals may be selected based on how important they are thought to be for determining the output signal selected at block 206 and weights are set for these selected internal signals. For example, internal signals that a designer thinks may be more important for determining an output signal may be assigned heavier weights. Hypothesizing internal signal importance may be a performance enhancement to help guide the technique to determine the internal signals most relevant to determining an output signal value. For example, randomly selecting a set of internal signals and/or trying all combinations of internal signals could also be used, but could be more computationally expensive. At block 210, a linear regression model for the output signal is created. In some cases, standard linear regression algorithms may be used to derive an output signal based on the set of internal signals. For example, a linear regression equation may be $Y=a+b_1X_1+b_2X_2 \ldots$, where Y is the output signal value, X is the signal values over time, a is a constant and b is the slope (e.g., weight). The coefficient (b) of such an equation may be determined using a linear fit formula such as $$b_1 = \sum \frac{(X_i - X)(Y_i - Y)}{\sum (X_i - x)^2}.$$

Internal signals that contribute less to determining the output signal may have a coefficient closer to zero and such signals may be dropped at block 212. In some cases, internal signals with a coefficient below a threshold value may be dropped.

At block 214, a non-linear regression model is created based on the remaining internal signals. For example, standard non-linear regression algorithms may be used to map the output signal to the remaining internal signals. For example, the equation $Y=f(X_1, \beta_1)+f(X_2, \beta_2) \ldots +\varepsilon$ may be applied, where Y is the output signal value, $\beta_1$ is a cost function or best fit non-linear model of $b_1$, $\beta_2$ is a cost function or best fit non-linear model of $b_2$, and X is the internal signal values over time. At block 216, coefficients of the non-linear regression model are compared to weights assigned to the candidate internal signals. A distribution of the coefficients for the remaining internal signals is compared to the weights assigned to the candidate input signals. For example, a coefficient associated with an internal signal expressed as a percentage may indicate how much that signal contributed to the output signal and this percentage may be compared to the weight assigned to that signal. If the coefficients match the assigned weights, execution proceeds to block 218. At block 218, if there are additional output signals, a next output signal is selected and execution returns to block 208 to process the next output signal. Otherwise, if all the output signals have been modelled, then execution ends. If the coefficients do not match the assigned weights at block 216, execution returns to block 208 where the weights may be reassigned based on the coefficients of the non-linear regression. This loop may repeat until the coefficients match the assigned weights. These weights may be stored along with the randomly chosen signal values data. The weights may be used for training an ML model of the IC along with the randomly chosen signal values data from block 204.

Figure 3A:
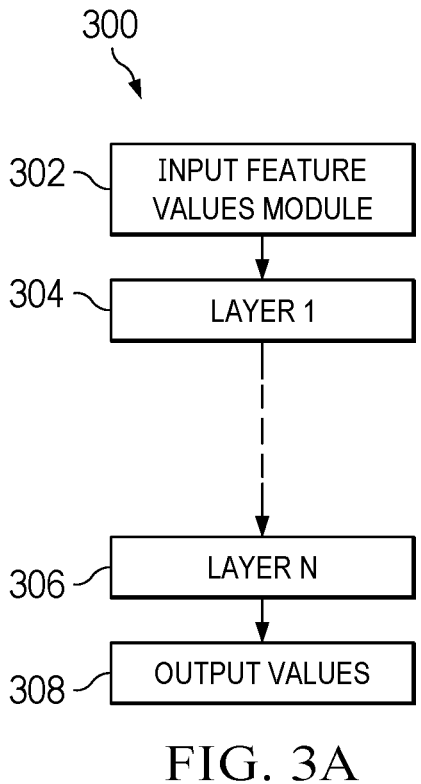
FIG. 3A is a block diagram illustrating an example ML model of an IC, in accordance with aspects of the present disclosure.

In accordance with aspects of the present disclosure, an ML model of the IC may be trained to predict an FSM state of the IC based on data signal values. FIG. 3A illustrates an example ML model 300 of an IC, in accordance with aspects of the present disclosure. The example ML model 300 is a simplified example of a neural network (NN) ML model presented to help understand how a NN ML model of an IC, such as a convolutional NN, can be structured. Examples of NN ML models may include VGG, MobileNet, ResNet, EfficientNet, RegNet, etc. It may be understood that each implementation of an ML model may execute one or more ML algorithms, and the ML model may be trained or tuned in a different way depending on a variety of factors, including, but not limited to, a type of ML model being used, parameters being used for the ML model, relationships among the parameters, desired speed of training, etc. In this simplified example, feature values are collected and prepared in an input feature values module 302. As an example, data signal values from the simulation (either from selected test cases or randomly selected, as discussed above) may be input into an ML model by placing the data signal values in, for example, a vector or matrix, as the input feature values by the input feature values module 302. Generally, parameters may refer to aspects of mathematical functions that may be applied by layers of the NN ML model 300 to features, which are the data points or variables.

Each layer (e.g., first layer 304 . . . Nth layer 306) may include a plurality of modules (e.g., nodes) and generally represents a set of operations that may be performed on the feature values, such as a set of matrix multiplications, convolutions, deconvolutions, etc. For example, each layer may include one or more mathematical functions that takes as input (aside from the first layer 304) the output feature values from a previous layer. The ML model outputs output values 308 from the last layer (e.g., the Nth layer 306). Weights that are input to the modules of each layer may be adjusted during ML model training and fixed after the ML model training. In some cases, the initial weights may be based on the weights determined via the technique for selecting signal values data and weights discussed in FIG. 2. In other cases, the initial weights may be randomly assigned, set via a pattern, etc. The ML model may include any number of layers. Generally, each layer transforms M number of input features to N number of output features.

In some cases, the ML model may be trained based on labelled input. The ML model 300 may be initiated with initial weights and the representative input passed into the ML model 300 to generate predictions. The representative inputs, such as signal values data from simulations of the IC, may include labels that identify the data to be predicted. For example, an ML model may be trained to predict an FSM state based on signal values data from simulations of the IC. This signal data value dataset may be labeled with corresponding encoded FSM state and transition condition information, as discussed above in conjunction with FIG. 1B.

The weights of the nodes may be adjusted based on how accurate the prediction is compared to the labels. The weights applied by a node may be adjusted during training based on a loss function, which is a function that describes how accurately the predictions of the neural network are as compared to the expected results (e.g., labels); an optimization algorithm, which helps determine weight settings adjustments based on the loss function; and/or a backpropagation of error algorithm, which applies the weight adjustments back through the layers of the neural network. Any optimization algorithm (e.g., gradient descent, mini-batch gradient descent, stochastic gradient descent, adaptive optimizers, momentum, etc.), loss function (e.g., mean-squared error, cross-entropy, maximum likelihood, etc.), and backpropagation of error algorithm (e.g., static or recurrent backpropagation) may be used within the scope of this disclosure.

Figure 3B:
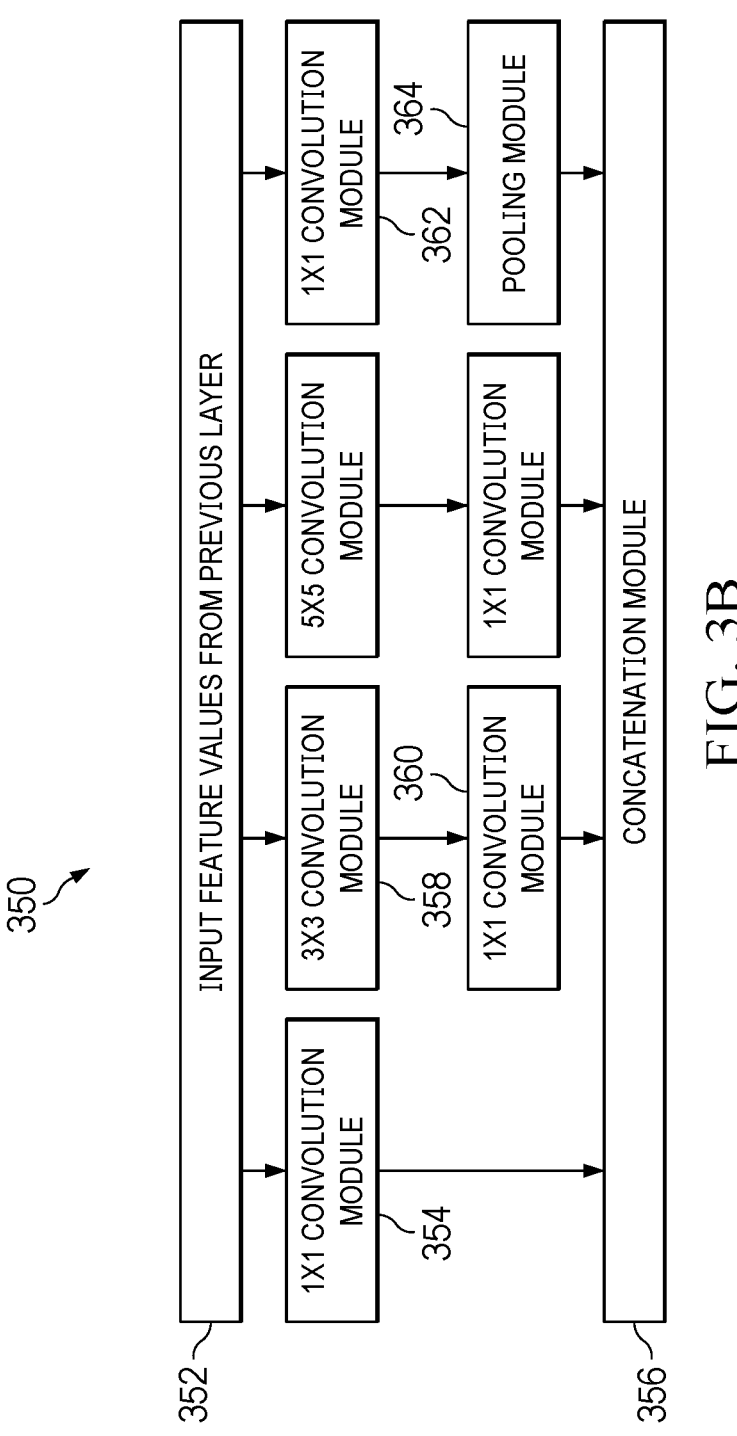
FIG. 3B is a block diagram illustrating an example structure of a layer of the ML model, in accordance with aspects of the present disclosure.

FIG. 3B illustrates an example structure of a layer 350 of the ML model 300, in accordance with aspects of the present disclosure. In some cases, one or more portions of the input feature values from a previous layer 352 (or input feature values from an input feature values module 302 for a first layer 304) may be input into a set of modules. Generally, modules of the set of modules may represent one or more sets of mathematical operations to be performed on the feature values, and each module may accept, as input, a set of weights, scale values, and/or biases. For example, a first 1×1 convolution module 354 may perform a 1×1 convolution operation on one or more portions of the input feature values and a set of weights (and/or bias/scale values). Of note, sets of modules of the one or more sets of modules may include different numbers of modules. Thus, output from the first 1×1 convolution module 354 may be input to a concatenation module 356. As another example, one or more portions of the input feature values from a previous layer 352 may also be input to a 3×3 convolution module 358, which outputs to a second 1×1 convolution module 360, which then outputs to the concatenation module 356. Sets of modules of the one or more sets of modules may also perform different operations. In this example, output from third 1×1 convolution module 362 may be input to a pooling module 364 for a pooling operation. Output from the pooling module 364 may be input to the concatenation module 356. The concatenation module 356 may receive outputs from each set of modules of the one or more sets of modules and concatenate the outputs together as output feature values. These output feature values may be input to a next layer of the ML model 300.

Figure 4:
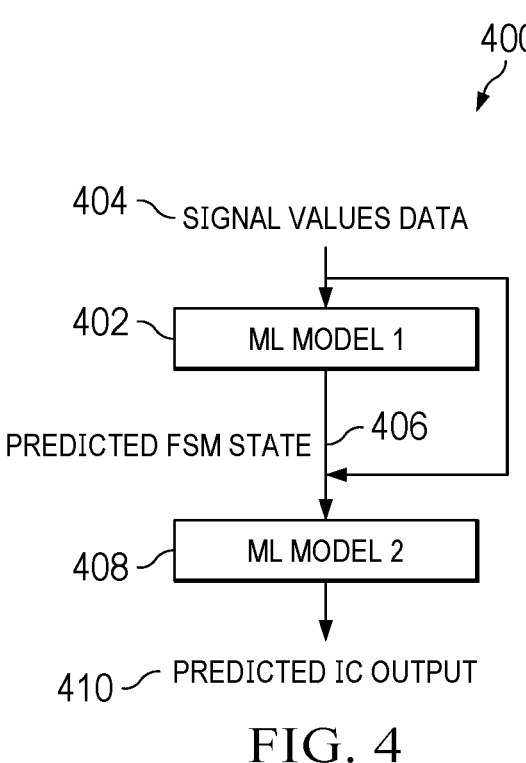
FIG. 4 is a block diagram illustrating a cascaded ML model of an IC, in accordance with aspects of the present disclosure.

In accordance with aspects of the present disclosure, multiple ML models, such as ML Model 300, may be cascaded, for example, to make multiple predictions. FIG. 4 is a block diagram 400 illustrating a cascaded ML model of an IC, in accordance with aspects of the present disclosure. In this example, a first ML model 402 may take, as input, signal values data 404, such as top-level signal values as well as internal signal values (either from selected test cases or randomly selected, as discussed above). The first ML model 402 predicts the FSM state 406 of the IC using the signal values data 404. This predicted FSM state 406 of the IC may then be input to a second ML model 408. The second ML model 408 may take, as input, the predicted FSM state 406 of the IC along with input signal values data of the modeled IC (e.g., signal values of input to the IC from the signal values data 404) and predict analog signal values output 410 from the modeled IC (e.g., signal values output by the IC). By cascading multiple ML models, more accurate predictions of the output signal values may be obtained as compared to a single ML model that does not account for the FSM state. For example, a particular internal signal value for an IC may be bound to a certain voltage range in one FSM state, but not bound to that voltage range in another FSM state. As another example, the voltage of a certain signal may increase rapidly before peaking and settling down in a certain FSM state, but this signal may be more stable in another FSM state. Taking into account the FSM state helps the overall ML model consider state specific behaviors of the signal values to make better predictions of the output signal values.

Figure 5:
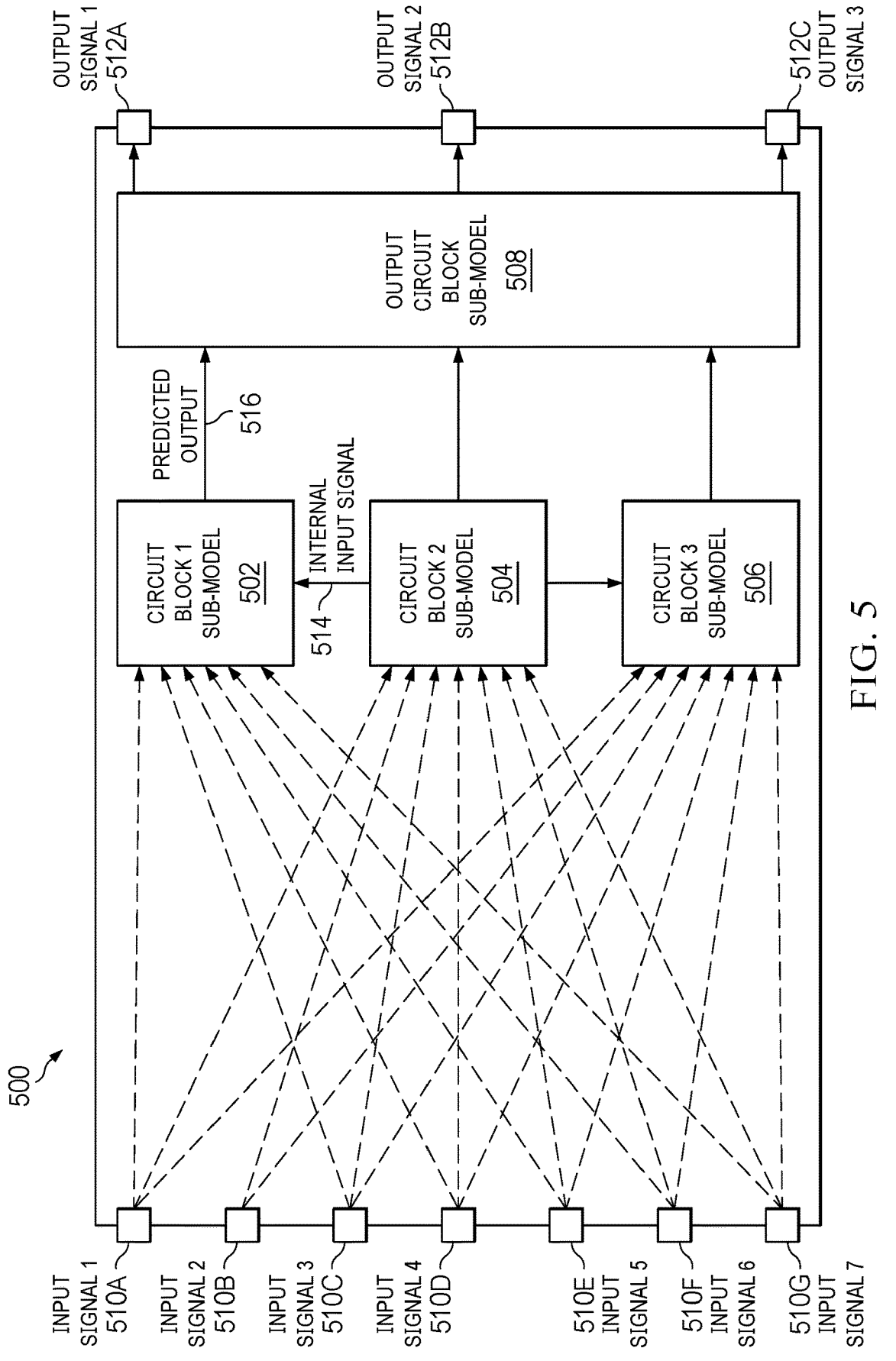
FIG. 5 is a block diagram of an example circuit block-level cascaded ML model, in accordance with aspects of the present disclosure.

In some cases, a circuit block-level cascaded ML model of the IC being modeled may be used. This circuit block-level cascaded ML model may be used to predict output signal values of the IC in place of an ML model that uses the FSM state of the modeled IC, for example, where the FSM model may not be available or otherwise not desired. In some cases, an overall IC may include many circuit blocks. FIG. 5 is a block diagram of an example circuit block-level cascaded ML model 500, in accordance with aspects of the present disclosure. Generally, a circuit block is a subset of an IC that provides certain functionality, regulation, interfaces, etc. for the IC. Examples of circuit blocks include, but are not limited to, low-dropout regulators, boost convertors, buck convertor blocks, analog to digital converters, etc. In some cases, an IC may include a number of circuit blocks integrated together.

A circuit block-level cascaded ML model includes ML sub-models of one or more circuit blocks of the overall IC being modeled. In this example the circuit block-level cascaded ML model 500 includes four sub-models of the circuit blocks of the IC, circuit block 1 sub-model 502, circuit block 2 sub-model 504, circuit block 3 sub-model 506, and an output circuit block sub-model 508. The circuit block-level cascaded ML model 500, like ML model 300, takes input signals values 510A-510G to the modeled IC and predicts output signal values 512A-512C of the IC.

Each circuit block sub-model is trained using data signal values from the simulation (either from selected test cases or randomly selected, as discussed above) that are input to a modeled circuit block of the IC to predict the output of the modeled circuit block. In this example, circuit block sub-model 502 of a modeled circuit block may take top level input signals of the IC input signal 1 510A and input signals 3-7 510C-510G, as well as internal signal(s) 514 of the IC that are input to the modeled circuit block. The circuit block sub-model 502 then predicts output(s) 516 of the circuit block sub-model 502. Output of a circuit block may be used as input (e.g., as an internal input signal) to another circuit block. Here, output 516 of the circuit block sub-model 502 is input to the output circuit block sub-model 508.

In some cases, the internal signals of an IC may not be available. For example, there may be no convenient way to access the internal signals of an in-silicon IC. Thus, when debugging a manufactured IC, there may not be access to the internal signal values to use for help when debugging. In such cases, an inverse model of the IC may be used to generate internal signal values based on input and output signal values.

FIG. 6 is a block diagram 600 illustrating use of an inverse model of an IC for debugging, in accordance with aspects of the present disclosure. In this example input signal values 602 and output signal values 604 of an IC may be monitored. These input signal values 602 and output signal values 604 may then be passed as input to an inverse model of the IC 606. The inverse model of the IC 606 predicts internal signal values 608 of the IC based on the input signal values 602 and output signal values 604. In some cases, the IC may include internal signals values 608 at different levels. These levels may correspond to, for example, different organizational levels of the IC. As an example, a first level of internal signals may correspond to internal signals between circuit blocks, while a second level may correspond to internal signals input to and output from certain circuit blocks, a third level may correspond to internal signals within certain circuit blocks, etc.

The inverse model of the IC 606 may be based on any ML model, including those discussed above in conjunction with FIGS. 3A/3B, FIG. 4, and FIG. 5. The inverse model of the IC 606 differs from the above discussed ML models in that the inverse model of the IC 606 takes the top-level signals (e.g., input signal values 602 and output signal values 604) of the modeled IC and predict internal signal values 608. The inverse mode of the IC 606 may be trained using a set of data signal values from the simulation (either from selected test cases or randomly selected, as discussed above). For example, the top-level data signal values from the set of data signal values and trained against the internal data signal values from the set of data signal values. In some cases, the internal data signal values correspond to a particular level of the internal signals. In some case FSM state information for the IC may also be used, for example, to train cascaded ML models. For example, a first ML model may be trained to predict FSM states based on the input top-level data signal values and this predicted FSM state may be input along with the top-level data signal values into a second ML model to predict internal data signal values 608 of the IC. In some cases, the predicted FSM state may be output.

The predicted internal data signal values 608 may then be compared 610 to the set of data signal values from the simulation 612 of the IC to determine how well the predicted internal signals line up with various conditions seen during development of the IC for debugging. As an example, using a low-dropout regulator (LDO), the output voltage of the circuit may track an internal reference signal generated from a bias-generation circuit. However, this internal reference signal value is not available on the input/output pins of the LDO. By predicting the internal reference value based on the signal values available on input/output pins of the LDO, the predicted internal reference value may be compared to reference values obtained during simulations of the LDO circuit to see if there are corresponding signal values. If there are no such corresponding signal values, then it may be possible that there is an internal fault with the circuit. At step 614, a statistical analysis may be performed to identify issues for further debugging. In some cases, the inverse model of the IC 606 may be distributable or otherwise made shareable, for example, to a customer of the IC for customer based debugging. For example, the inverse model of the IC 606 may be wrapped in a module that can be accessible from a variety of diagnostic tool platforms, such as MATLAB, Octave, Python, etc. In some cases, the inverse model of the IC 606 and/or the set of data signal values from the simulation may be encrypted as delivered to a customer of the IC.

FIG. 7 is a flow diagram 700 illustrating a technique for debugging an integrated circuit, in accordance with aspects of the present disclosure. At block 702, input signal values and output signal values are obtained from an integrated circuit. For example, when debugging an integrated circuit, such as an analog or hybrid analog/digital circuit, the input signal values (e.g., voltage values applied to inputs of the IC) and output signal values (e.g., voltage values on the outputs of the IC) may be measured from an IC being debugged and input to a debugging device.

At block 704, the obtained input signal values and output signal values are provided to a machine learning model and at block 706, a predicted set of signal values is obtained from the ML model. For example, the debugging device may include an ML model that predicts internal signal values of the IC based on the input signal values and output signal values. This ML model may be an ML model as discussed above with respect to FIGS. 3A/3B, FIG. 4, and FIG. 5. In some cases, the ML model may predict an FSM state based on the provided input signal values and output signal values. In some cases, the ML model may output the predicted FSM state. This FSM state may be used for debugging the IC. In some cases, the ML model may include one or more sub-models. In some cases, a sub-model of the one or more sub-models may predict outputs of circuit blocks of the IC. The predicted outputs of multiple circuit blocks may then be used to predict an output of the IC. In some cases, a sub-model may predict the FSM state of the IC.

The ML models may be trained based on data signal values of the IC generated by simulations of the IC. In some cases, the simulated signal values are generated based on a set of test cases for the integrated circuit. These test cases may be identified, for example from a suite of test cases, as the most relevant test cases based on coverage metrics. In some cases, the simulated signal values are associated with internal signals identified based on a linear regression model and a non-linear regression model. In some cases, the simulated signal values may be randomly reduced by a certain number or percentage prior to applying the linear regression model or the non-linear regression model. The predicted set of signal values correspond to signals internal to the integrated circuit.

At block 708, the predicted set of signal values are compared to one or more expected signal values for debugging the integrated circuit. For example, a statistical analysis may be performed between the predicted set of signal values and data signal values obtained from simulations of the IC to debug the IC, for example, by determining whether the predicted set of signal values deviate from the data signal values obtained from simulations and how this deviation occurs across time.

FIG. 8 is a flow diagram 800 illustrating a technique for validating an IC, in accordance with aspects of the present disclosure. At block 802, a set of simulated signal values for an integrated circuit are obtained. For example, during IC development an ML model can be created as a reference model for verification operation of the IC, for example, during validation and equivalence checking of prototype ICs. The ML model may be trained based on simulations of the IC, for example using a SPICE model and possibly with an FSM model of the IC. In some cases, the simulated signal values are generated based on a set of test cases for the integrated circuit. These test cases may be identified, for example, from a suite of test cases, as the most relevant test cases based on coverage metrics. In some cases, the simulated signal values are associated with internal signals identified based on a linear regression model and a non-linear regression model. In some cases, the simulated signal values may be randomly reduced by a certain number or percentage prior to applying the linear regression model or the non-linear regression model.

At block 804, the obtained set of signal values are provided to an ML model. For example, the ML model may be trained to predict output data signal values for the IC based on top-level and possibly internal data signal values (if available) input to the ML model. The ML model may be an ML model as discussed above with respect to FIGS. 3A/3B, FIG. 4, and FIG. 5. In some cases, the ML model may predict an FSM state based on the provided input signal values and output signal values. In some cases, the ML model may output the predicted FSM state. This FSM state may be used for debugging the IC. In some cases, the ML model may include one or more sub-models. In some cases, a sub-model of the one or more sub-models may predict outputs of circuit blocks of the IC. The predicted outputs of multiple circuit blocks may then be used to predict an output of the IC. In some cases, a sub-model may predict the FSM state of the IC. At block 806, one or more predicted output signal values of the integrated circuit are obtained from the machine learning model.

At block 808, the predicted output signal values are compared to actual output signal values of the integrated circuit to validate the integrated circuit.

Figure 9:
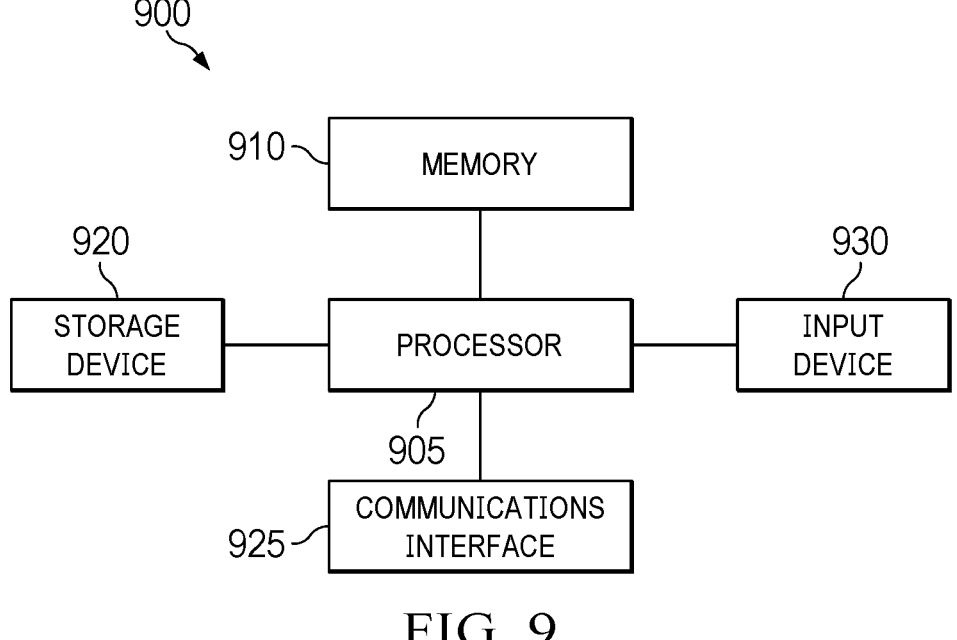
FIG. 9 is a block diagram of an example a computing device, in accordance with aspects of the present disclosure.

As illustrated in FIG. 9, device 900 includes processing circuitry, such as processor 905 that contains one or more hardware processors, where each hardware processor may have a single or multiple processor cores. Examples of processors include, but are not limited to, a central processing unit (CPU), image processor, microcontroller (MCU) microprocessor (MPU), digital signal processor (DSP), a field-programmable gate array (FPGA), an application-specific integrated circuit (ASIC), etc. Although not illustrated in FIG. 5, the processing circuitry that makes up processor 905 may also include one or more other types of hardware processing components, such as graphics processing units (GPUs), application specific integrated circuits (ASICs), field-programmable gate arrays (FPGAs), and/or digital signal processors (DSPs). In certain cases, processor 905 may be configured to perform the tasks described in conjunction with the technique described in FIGS. 7 and 8. In some cases, the processor 905 may be configured to select signal values data and/or train the ML models described in FIGS. 2, 3A/3B, 4, 5, and 6.

FIG. 9 illustrates that memory 910 may be operatively and communicatively coupled to processor 905. Memory 910 may be a non-transitory computer readable storage medium configured to store various types of data. For example, memory 910 may include one or more volatile devices, such as random-access memory (RAM), registers, etc. Non-volatile storage devices 920 can include one or more disk drives, optical drives, solid-state drives (SSDs), tap drives, flash memory, electrically erasable programmable read-only memory (EEPROM), and/or any other type memory designed to maintain data for a duration of time after a power loss or shut down operation. The non-volatile storage devices 920 may also be used to store programs that are loaded into the RAM when such programs are executed. In some cases, programs stored in the non-volatile storage device 920 may be executed directly from the non-volatile storage device 920. Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage device 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g. data stored by a storage device 920, may be accessed by processor 905 during the execution of computer executable instructions or process steps to instruct one or more components within the computing device 900. Storage device 920 may be partitioned or split into multiple sections that may be accessed by different software programs. For example, storage device 920 may include a section designated for specific purposes, such as storing program instructions or data for updating software of the computing device 900. In one embodiment, the software to be updated includes the ROM, or firmware, of the computing device. In certain cases, the computing device 900 may include multiple operating systems. For example, the computing device 900 may include a general-purpose operating system that is utilized for normal operations. The computing device 900 may also include another operating system, such as a bootloader, for performing specific tasks such as upgrading and recovering the general-purpose operating system and allowing access to the computing device 900 at a level generally not available through the general-purpose operating system. Both the general-purpose operating system and another operating system may have access to the section of storage device 920 designated for specific purposes.

The one or more communications interfaces 925 may include a radio communications interface for interfacing with one or more radio communications devices, such as an AP (not shown in FIG. 9). In certain cases, elements coupled to the processor may be included on hardware shared with the processor. For example, the communications interfaces 925, storage device 920, and memory 910 may be included along with other elements, such as the digital radio, in a single chip or package, such as in a system on a chip (SOC). Computing device 900 may also include input device 930 and/or output devices (not shown), examples of which include sensors, cameras, human input devices such as mouse, keyboard, touchscreen, monitors, display screen, tactile or motion generators, speakers, lights, etc. Processed input, for example from the image sensor, may be output from the computing device 900 via the communications interfaces 925 to one or more other devices.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Modifications are possible in the described embodiments, and other embodiments are possible, within the scope of the claims.

The invention claimed is:

1. A method, comprising:
   analyzing a plurality of test cases to obtain coverage metrics indicative of an extent to which respective test cases cover a plurality of states of a finite-state-machine (FSM) associated with an integrated circuit;
   obtaining a set of simulated signal values for the integrated circuit based on a subset of the plurality of test cases, the subset of the plurality of test cases including fewer test cases than the plurality of test cases, the subset selected based the coverage metrics;
   providing the obtained set of simulated signal values to a machine learning model;
   obtaining, from the machine learning model, one or more predicted output signal values of the integrated circuit; and
   comparing the predicted output signal values to actual output signal values of the integrated circuit to validate the integrated circuit.

2. The method of claim 1, wherein the set of simulated signal values is associated with internal signals identified based on a linear regression model and a non-linear regression model.

3. The method of claim 1, wherein the machine learning model predicts an FSM state based on a provided set of analog signal values.

4. The method of claim 3, further comprising obtaining, from the machine learning model, a predicted finite state machine state for the integrated circuit.

5. The method of claim 1, wherein the machine learning model includes one or more sub-models.

6. The method of claim 1, further including ranking the plurality of test cases in descending order of the coverage metrics.

7. The method of claim 6, wherein top test cases are selected based on the ranking.

8. A non-transitory program storage device comprising instructions stored thereon to cause one or more processors to:

analyze a plurality of test cases to obtain coverage metrics indicative of an extent to which respective test cases cover a plurality of states of a finite-state-machine (FSM) associated with an integrated circuit;

obtain a set of simulated signal values for the integrated circuit based on a subset of the plurality of test cases, the subset of the plurality of test cases including fewer test cases than the plurality of test cases, the subset selected based the coverage metrics;

provide the obtained set of simulated signal values to a machine learning model;

obtain, from the machine learning model, one or more predicted output signal values of the integrated circuit; and compare the predicted output signal values to actual output signal values of the integrated circuit to validate the integrated circuit.

9. The non-transitory program storage device of claim 8, wherein the set of simulated signal values is associated with internal signals identified based on a linear regression model and a non-linear regression model.

10. The non-transitory program storage device of claim 8, wherein the machine learning model predicts an FSM state based on a provided set of analog signal values.

11. The non-transitory program storage device of claim 10, wherein the instructions further cause the processors to obtain, from the machine learning model, a predicted finite state machine state for the integrated circuit.

12. The non-transitory program storage device of claim 8, wherein the machine learning model includes one or more sub-models.

13. The non-transitory program storage device of claim 8, wherein the instructions further cause the processors to rank the plurality of test cases in descending order of the coverage metrics.

14. The non-transitory program storage device of claim 13, wherein top test cases are selected based on the ranking.

15. A system for debugging an integrated circuit, comprising:

a memory; and one or more processors operatively coupled to the memory, wherein the one or more processors are configured to execute instructions causing the one or more processors to:

analyze a plurality of test cases to obtain coverage metrics indicative of an extent to which respective test cases cover a plurality of states of a finite-state-machine (FSM) associated with the integrated circuit;

obtain a set of simulated signal values for the integrated circuit based on a subset of the plurality of test cases, the subset of the plurality of test cases including fewer test cases than the plurality of test cases, the subset selected based the coverage metrics;

provide the obtained set of simulated signal values to a machine learning model;

obtain, from the machine learning model, one or more predicted output signal values of the integrated circuit; and compare the predicted output signal values to actual output signal values of the integrated circuit to validate the integrated circuit.

16. The system of claim 15, wherein the set of simulated signal values is associated with internal signals identified based on a linear regression model and a non-linear regression model.

17. The system of claim 15, wherein the machine learning model predicts an FSM state based on a provided set of analog signal values.

18. The system of claim 17, wherein the instructions further cause the processors to obtain, from the machine learning model, a predicted finite state machine state for the integrated circuit.

19. The system of claim 15, wherein the instructions further cause the processors to rank the plurality of test cases in descending order of the coverage metrics.

20. The system of claim 19, wherein top test cases are selected based on the ranking.

\*    \*    \*    \*    \*